(12) United States Patent
Ohnemus et al.

(10) Patent No.: US 10,369,879 B2
(45) Date of Patent: Aug. 6, 2019

(54) HYBRID MODULE

(71) Applicant: Bayerische Motoren Werke Aktiengesellschaft, Munich (DE)

(72) Inventors: Ulrich Ohnemus, Hattenhofen (DE); Edmund Bauchrowitz, Hohenkammer (DE); Markus Nussbaumer, Munich (DE); Alexander Martin, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 48 days.

(21) Appl. No.: 15/333,272

(22) Filed: Oct. 25, 2016

(65) Prior Publication Data

US 2017/0036529 A1    Feb. 9, 2017

Related U.S. Application Data

(63) Continuation of application No. PCT/EP2015/058349, filed on Apr. 17, 2015.

(30) Foreign Application Priority Data

Apr. 28, 2014  (DE) .................. 10 2014 207 884

(51) Int. Cl.
| | | |
|---|---|---|
| *B60K 6/48* | (2007.10) | |
| *B60W 30/20* | (2006.01) | |
| *B60K 6/387* | (2007.10) | |
| *B60K 6/40* | (2007.10) | |

(Continued)

(52) U.S. Cl.
CPC .............. *B60K 6/48* (2013.01); *B60K 6/387* (2013.01); *B60K 6/40* (2013.01); *B60K 6/54* (2013.01);

(Continued)

(58) Field of Classification Search
CPC . B60K 6/48; B60K 6/387; B60K 6/40; B60K 6/54; B60K 2006/4825;

(Continued)

(56) References Cited

U.S. PATENT DOCUMENTS

| | | | | |
|---|---|---|---|---|
| 8,942,902 B2 * | 1/2015 | Moseler | .................. | F16D 25/14 701/68 |
| 9,010,468 B2 * | 4/2015 | Nomura | .................. | B60K 6/383 180/65.21 |

(Continued)

FOREIGN PATENT DOCUMENTS

| | | |
|---|---|---|
| AT | 507 523 A2 | 5/2010 |
| CN | 1943970 A | 4/2007 |

(Continued)

OTHER PUBLICATIONS

International Search Report (PCT/ISA/210) issued in PCT Application No. PCT/EP2015/058349 dated Jul. 20, 2015 with English translation (Six (6) pages).

(Continued)

*Primary Examiner* — John D Walters
(74) *Attorney, Agent, or Firm* — Crowell & Moring LLP

(57) ABSTRACT

A hybrid module for a powertrain includes a drive, a first coupling section that couples the hybrid module to a transmission, and a second coupling section that couples the hybrid module to an internal combustion engine. The second coupling section includes a shifting arrangement having at least two shift elements which can take an initial and a shift position.

11 Claims, 1 Drawing Sheet

(51) Int. Cl.
*F16D 25/061* (2006.01)
*F16D 23/02* (2006.01)
*F16D 48/06* (2006.01)
*B60W 20/15* (2016.01)
*B60K 6/54* (2007.10)

(52) U.S. Cl.
CPC ............ *B60W 20/15* (2016.01); *B60W 30/20* (2013.01); *F16D 23/02* (2013.01); *F16D 25/061* (2013.01); *F16D 48/06* (2013.01); *B60K 2006/4825* (2013.01); *B60W 2030/206* (2013.01); *B60Y 2304/01* (2013.01); *B60Y 2306/03* (2013.01); *B60Y 2400/112* (2013.01); *B60Y 2400/48* (2013.01); *B60Y 2400/70* (2013.01); *F16D 2500/1045* (2013.01); *F16D 2500/1066* (2013.01); *F16D 2500/10462* (2013.01); *Y02T 10/6221* (2013.01); *Y02T 10/6252* (2013.01)

(58) Field of Classification Search
CPC ................ B60W 20/15; B60W 30/20; B60W 2030/206; F16D 23/02; F16D 25/061; F16D 48/06; F16D 2500/1045; F16D 2500/10462; F16D 2500/1066; B60Y 2304/01; B60Y 2306/03; B60Y 2400/112; B60Y 2400/48; B60Y 2400/70; Y02T 10/6221; Y02T 10/6252
USPC ....................................... 180/65.25
See application file for complete search history.

(56) References Cited

U.S. PATENT DOCUMENTS

2007/0077116 A1* 4/2007 Leimann ................. B23B 1/00
403/359.1

| | | | |
|---|---|---|---|
| 2012/0217075 A1 | 8/2012 | Nomura et al. | |
| 2013/0231836 A1 | 9/2013 | Moseler | |

FOREIGN PATENT DOCUMENTS

| | | |
|---|---|---|
| CN | 102649463 A | 8/2012 |
| CN | 103291779 A | 9/2013 |
| DE | 195 03 501 A1 | 8/1996 |
| DE | 10 2012 203 184 A1 | 9/2013 |
| EP | 1 772 641 A1 | 4/2007 |
| EP | 1 925 486 A1 | 5/2008 |
| EP | 2 492 126 A1 | 8/2012 |
| GB | 2 196 912 A | 5/1988 |
| JP | 2013-1182 A | 1/2013 |

OTHER PUBLICATIONS

German-language Written Opinion (PCT/ISA/237) issued in PCT Application No. PCT/EP2015/058349 dated Jul. 20, 2015 (Six (6) pages).

German-language Search Report issued in counterpart German Application No. 10 214 207 884.9 dated Jan. 20, 2015 with partial English translation (Thirteen (13) pages).

"Kupplungssysteme fuer Pkw bis 800 Nm", ZF Sachs AG, Sep. 1, 2009, Retrieved from URL [Retrieved on Jul. 9, 2015]: http://www.zf.com/media/media/documents/corporate_2/downloads_1/flyer_and_brochures/powertrain_and_suspension_components/01_ZF_sachs_Produktinformation_Pkw_A_Kupplungssysteme_dt_ebook.pdf, pp. 1-20 (Eleven (11) sheets).

Chinese-language Office Action issued in counterpart Chinese Application No. 201580003893.8 dated Oct. 16, 2017 with English translation (Twelve (12) pages).

* cited by examiner

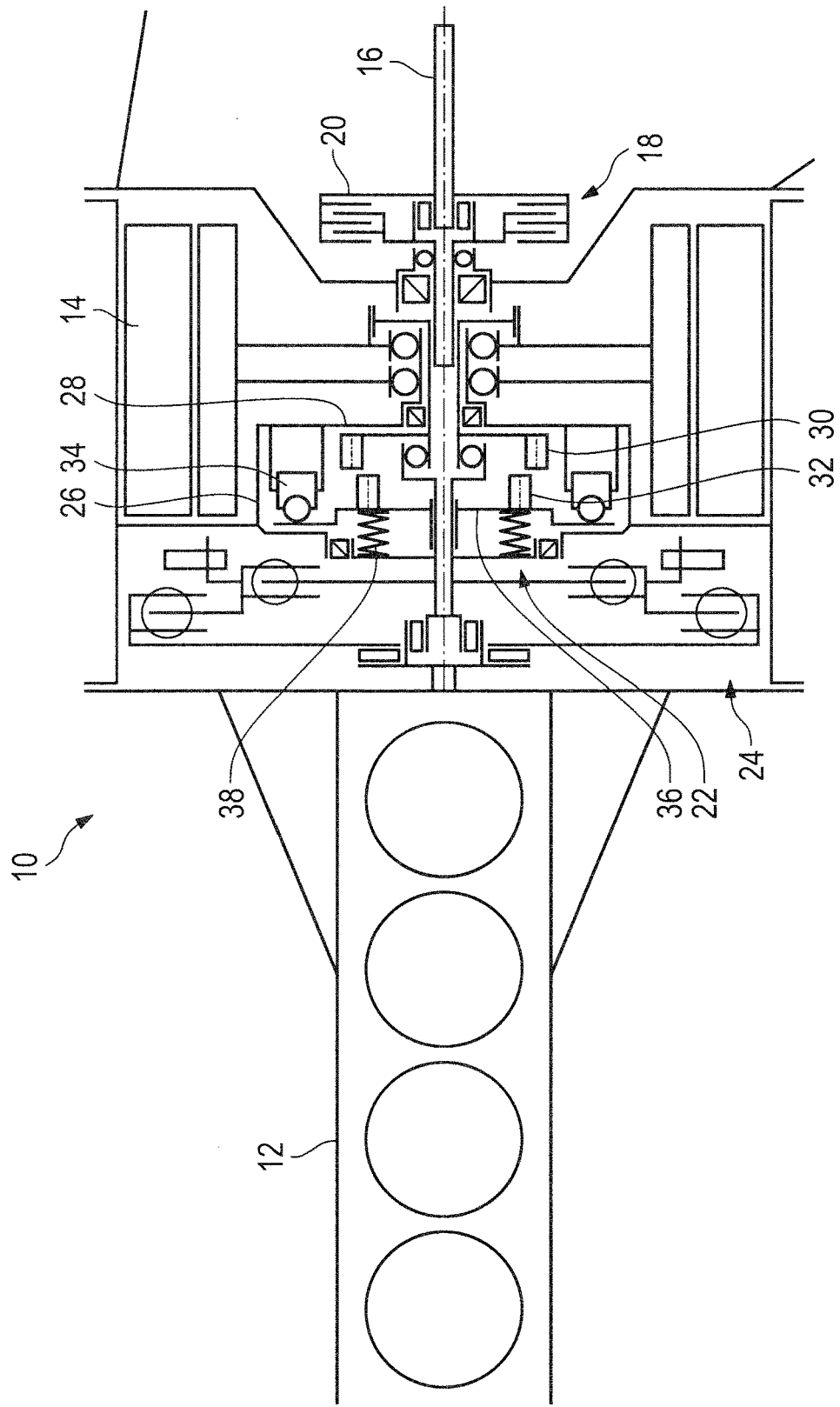

HYBRID MODULE

CROSS REFERENCE TO RELATED APPLICATIONS

This application is a continuation of PCT International Application No. PCT/EP2015/058349, filed Apr. 17, 2015, which claims priority under 35 U.S.C. § 119 from German Patent Application No. 10 2014 207 884.9, filed Apr. 28, 2014, the entire disclosures of which are herein expressly incorporated by reference.

BACKGROUND AND SUMMARY OF THE INVENTION

The invention relates to a hybrid module for a drive train.

The automotive sector is increasingly trending toward hybrid vehicles, which include a further drive, such as an electric drive, for example, in addition to a conventional internal combustion engine. The two drives are typically coupled to a drive train via what is known as a hybrid module, so that the torque generated by the drives can be transmitted to a shared driven axle of the hybrid vehicle. The two drives have different optimal operating points, for which reason at least the internal combustion engine is decoupled from the drive train in certain operating ranges. This is typically carried out by way of a separating clutch.

For comfort reasons, it is preferred for the vibrations generated by the internal combustion engine to be damped to an extent as great as possible. A damping system is thus provided for vibration damping. All these components require installation space; said space, however, is only available to a limited extent because the body of a hybrid vehicle is no different from that of a conventional vehicle. The limited available installation space accordingly affects the dimensions of the further drive, causing the power of the same to be limited.

It is one object of the invention to create a hybrid module that allows an internal combustion engine and a further drive to be coupled to a drive train in minimized space.

This and other objects of the invention are achieved by a hybrid module for a drive train, comprising a drive, in particular an electric drive, a first coupling section for coupling the hybrid module to a transmission, and a second coupling section for coupling the hybrid module to an internal combustion engine, wherein the second coupling section comprises a shifting system having at least two shifting elements, which can assume a starting position and a shifting position.

One aspect of the invention is to couple the hybrid module to the internal combustion engine via a shifting system that requires less installation space than the customarily used separating clutch. The space that is saved can be available for the further drive, for example, whereby the same can be designed to be more powerful. The hybrid module furthermore creates installation space for a friction starting clutch connected upstream of the actual transmission set, or for an upstream integrated starting element. Said starting element can be used for starting with slippage, which is to say a rotational speed that is greater than the output rotational speed, which is zero, is generated via the internal combustion engine and/or the electric motor. The internal combustion engine can be started via the hybrid electric motor or a separate starter device. The torque converter used in drive trains of automatic transmissions can be dispensed with.

One aspect of the invention provides for a damping system for torsional vibrations, which comprises in particular at least one dual mass flywheel and/or a centrifugal pendulum. The damping system can effectively damp the vibrations originating from the internal combustion engine, so that the drive train is subjected to uneven running characteristics to a lesser degree. Due to the configuration of the hybrid module according to the invention, and in particular of the second coupling section, the damping system can have a more comprehensive design, whereby the vibrations that occur can be suppressed even better.

According to a further aspect of the invention, the shifting system comprises an actuator, which actuates at least one of the shifting elements, and in particular actuates the same electrohydraulically or electromechanically. The shifting system comprises an electromechanical or electrohydraulic shifting actuator, which can be used to actuate at least one of the shifting elements autonomously with respect to the main transmission, which is to say independently of the same.

In particular, the shifting elements are coupled in a chamber accommodating a lubricant. The shifting elements are thus lubricated, whereby friction-induced signs of wear over the operating time of the hybrid module are mitigated. The chamber can be designed such that sufficient lubricant is present to lubricate the shifting elements over the entire service lives thereof. Possible lubricants are in particular oil or grease.

A further aspect of the invention provides for the shifting elements to be designed in a form-locked manner with respect to each other, and in particular as claw elements. High forces can thus be transmitted in the shifting position since the shifting elements bear on one another across a large surface area. This reduces the signs of wear on the shifting elements.

Furthermore, the shifting elements can have a substantially cylindrical design, wherein, in the shifting position, the one shifting element at least partially surrounds the other shifting element peripherally. In this way, it is ensured that the two shifting elements cooperate with each other across a large effective surface, whereby the coupling can be achieved quickly and torque transmission is accordingly favorable.

In particular, the shifting elements can have a conical design, so that they nestle more gently inside one another during the transition from the starting position into the shifting position.

A further aspect of the invention provides for the shifting elements to be provided with friction surfaces. Friction torque is generated via the friction surfaces, which improves coupling and torque transmission. The friction surfaces can also be used to synchronize the shifting operation.

In particular, the shifting system comprises at least one spring element, which is provided between one of the shifting elements and the damping system. The spring element ensures that the hybrid module couples the drive train to one of the two drives when the actuator fails. This may in particular involve the internal combustion engine, which is coupled to the drive train when the electronics system of the hybrid vehicle fails.

The shifting system is normally closed by way of the spring element, which is to say it is in the normally closed position.

According to a further aspect of the invention, the coupling sections are designed as part of a keyed joint. The hybrid module can thus be easily coupled to a transmission and to the internal combustion engine. In this way, the hybrid module in particular has a modular design and can be used for different drive trains.

Furthermore, shiftable freewheeling may be provided on the hybrid module, so that the internal combustion engine and the further drive can be decoupled from the driven assembly.

Further advantages and properties of the invention will be apparent from the following description and the FIGURE being referenced.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a hybrid module 10, which is coupled to an internal combustion engine 12.

DETAILED DESCRIPTION OF THE DRAWINGS

The hybrid module 10 includes a further drive 14 in the form of an electric drive, which forms part of the hybrid module 10. The hybrid module 10 is designed such that both the electric drive 14 and the internal combustion engine 12 can be coupled to a drive train 16 at the same time.

At a first axial end, the hybrid module 10 includes a first coupling section 18, by way of which a transmission, which is not shown, can be coupled to the hybrid module 10. So as to be able to decouple the hybrid module 10 from the transmission, the first coupling section 18 includes a startable separating clutch 20 having a higher dynamic design, which is to say a starting clutch that can tolerate higher friction. If the separating clutch 20 is to protrude partially into the installation space of the hybrid module, of the electric motor rotor, it must be designed as a wet friction clutch.

The transmission may be an automatic, a semi-automatic, a dual-clutch, or a manual transmission.

At the other axial end, the hybrid module 10 includes a second coupling section 22, by way of which the hybrid module 10 is coupled to the internal combustion engine 12. A damping system 24 is moreover provided in the region of the second coupling section 22, the damping system being designed as a dual mass flywheel in the shown embodiment and damping the vibrations of the internal combustion engine 12.

Alternatively, the damping system 24 can include a centrifugal pendulum, which may also be provided in addition to the dual mass flywheel.

The second coupling section 22 furthermore includes a shifting system 26, which includes a housing 28 in which at least two shifting elements 30, 32 are disposed. The internal combustion engine 12 can be coupled to the drive train 16 by way of the two shifting elements 30, 32, so that the torque generated by the internal combustion engine 12 can be transmitted to the drive train 16, and in particular to the driven axle.

The housing 28 is in particular designed as a chamber in which a lubricant is accommodated, whereby the shifting elements 30, 32 located therein are lubricated.

The shifting elements 30, 32 can have a form-locked design, for example as claw elements, whereby the transmission of power from the internal combustion engine 12 to the drive train 16 is ensured.

According to an exemplary embodiment, the shifting elements 30, 32 can have a cylindrical design, so that, in the shifting position, they make contact with one another via mutually opposing circumferential surfaces.

The shifting elements 30, 32 can furthermore generally be provided with friction surfaces, so that a certain amount of torque can also be transmitted with slippage. After a relative rotational speed that now is only minimal has been ensured, the shifting elements can ensure the actual torque transmission by way of form fit.

The FIGURE shows the shifting elements 30, 32 in the starting position thereof. So as to transfer the two shifting elements 30, 32 into the shifting position thereof, an actuator 34 is provided, which forms part of the shifting system 26. The actuator 34 acts on at least one of the two shifting elements 30, 32 directly or indirectly, so that these engage, whereby the internal combustion engine 12 is coupled to the drive train 16. The actuator 34 is likewise disposed within the housing 28.

The actuator 34 can be driven electrohydraulically or electromechanically, so that the control for adjusting the shifting elements 30, 32 is accordingly fine.

In the shown embodiment, the second shifting element 32 is furthermore attached to a holding element 36, which can be acted on by the actuator 34 and additionally comprises at least one spring element 38.

The normally closed function is ensured by way of the spring element 38, so that the decoupling of the internal combustion engine 12 must be actively carried out, for example when the electronics system of the hybrid vehicle fails, whereby the internal combustion engine 12 is automatically mechanically coupled to the hybrid module 10 and the drive train 16 by way of the spring element 38.

The two coupling sections 18, 22 can in particular be designed as part of a keyed joint, so that the hybrid module 10 can be easily coupled to the internal combustion engine 12 and the transmission disposed in the drive train 16. In this way, in particular a modular design of the hybrid module 10 is possible, so that the same can be coupled to various transmissions and drive systems.

Furthermore, the hybrid module can be separately tested. The end-of-line (EOL) test can be carried out without difficulty.

The operating principle of the hybrid module 10 according to the invention is as follows:

The hybrid vehicle, which comprises such a hybrid module 10, is driven only by way of the electric drive 14 in a first driving situation, for example starting. For this purpose, the internal combustion engine 12 is decoupled from the drive train 16, as is shown in FIG. 1.

The actuator 34 acts on the holding element 36 for this purpose, against the spring pressure of the spring element 38, so that the two shifting elements 30, 32 are disengaged. The internal combustion engine 12 is thereby decoupled from the drive train 16.

If the electric vehicle now accelerates such that the electric drive 14 is no longer able to provide the required power, the internal combustion engine 12 is coupled to the drive train 16.

The actuator 34 is controlled within a required speed window for the shifting process so that the holding element 36, together with the shifting element 32 disposed thereon, is axially displaced by the spring pressure of the spring element 38, whereby the shifting elements 32, 30 engage. The internal combustion engine 12 is thereby coupled to the drive train 16.

In this position, the electric motor 14 remains coupled to the drive train 16 and is now operated as a generator, so that the internal combustion engine 12 at the same time charges a storage medium of the electric drive 14, such as a battery, for example.

However, the electric motor 14 can also contribute a driving torque, simultaneously with the internal combustion engine 12, which is to say provide a "boost."

In this driving situation, the vibrations of the internal combustion engine 12 are damped via the damping system 24, so that the vibrations in the drive train 16 originating from the internal combustion engine 12 are largely suppressed.

Due to the lower space requirement of the switching system 26 compared to a separating clutch, the electric drive 14 and/or the damping system 24 can be designed larger, so that the performance capability of the electric drive 14 or the damping properties of the damping system 24 are improved.

Due to the simple configuration of the coupling sections 18, 22, the hybrid module 10 furthermore has a modular design, so that it can be used for both in-line and front-transverse drive trains.

In general, a hybrid module 10 having a lower axial installation space is thus created.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid module for a drive train, comprising:
   a drive;
   a first coupling section that couples the hybrid module to a transmission;
   a clutch that is associated with the first coupling section; and
   a second coupling section that couples the hybrid module to an internal combustion engine, wherein
      the second coupling section comprises a shifting system having at least two shifting elements, which assume a starting position and a shifting position.

2. The hybrid module according to claim 1, wherein a damping system for torsional vibrations is provided, which comprises a dual mass flywheel and/or a centrifugal pendulum.

3. The hybrid module according to claim 1, wherein the shifting system comprises an actuator, which actuates at least one of the shifting elements, and in particular actuates the same electrohydraulically or electromechanically.

4. The hybrid module according to claim 3, wherein the shifting elements are coupled in a chamber in which a lubricant is accommodated.

5. The hybrid module according to claim 4, wherein the shifting elements are designed in a form-locked manner with respect to each other as claw elements.

6. The hybrid module according to claim 5, wherein the shifting elements have a substantially cylindrical design, in the shifting position, the one shifting element at least partially surrounds the other shifting element peripherally.

7. The hybrid module according to claim 6, wherein the shifting elements are provided with friction surfaces, which cooperate with each other in the shifting position.

8. The hybrid module according to claim 7, wherein the shifting system comprises at least one spring element, which is provided between one of the shifting elements and the damping system.

9. The hybrid module according to claim 8, wherein the coupling sections are designed as part of a keyed joint.

10. The hybrid module according to claim 9, wherein shiftable freewheeling is provided.

11. The hybrid module according to claim 1, wherein the drive is an electric drive.

\* \* \* \* \*